Aug. 16, 1966   G. C. J. PARENT ET AL   3,266,702
APPARATUS FOR PRODUCING WELDED DISK WHEELS
Original Filed Sept. 26, 1960   3 Sheets-Sheet 1

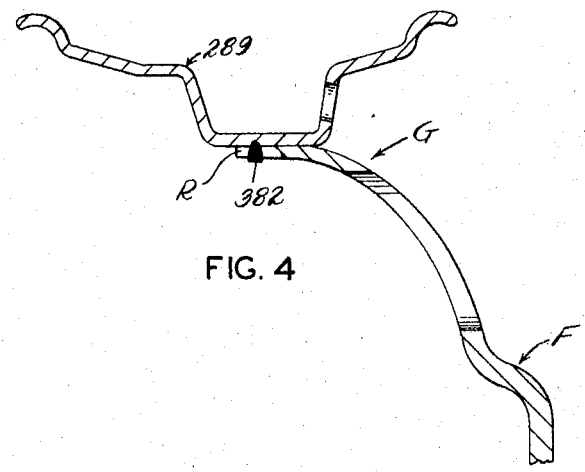
FIG. 4
FIG. 5
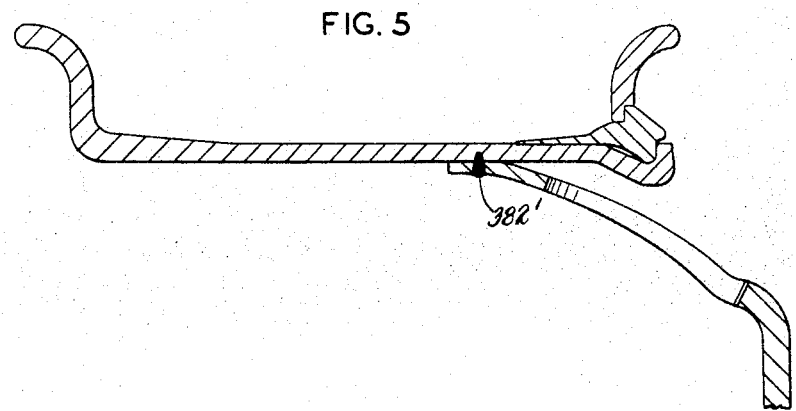
FIG. 6
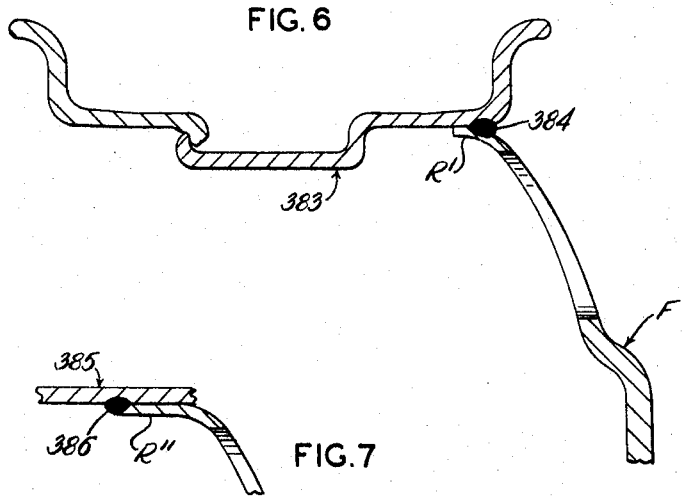
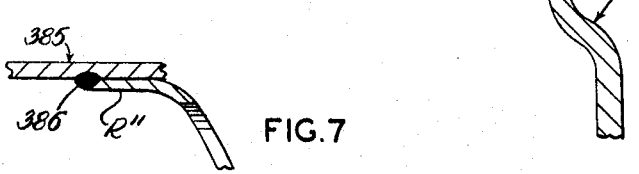
FIG. 7

United States Patent Office 3,266,702
Patented August 16, 1966

3,266,702
APPARATUS FOR PRODUCING WELDED DISK WHEELS
Gordon C. J. Parent, Southgate, and Karl Luther, Lathrup Village, Mich., and Walter W. Bulgrin and Meredith H. MacKusick, Akron Ohio, assignors to the Firestone Tire & Rubber Company, Akron, Ohio, a corporation of Ohio
Original application Sept. 26, 1960, Ser. No. 58,581, now Patent No. 3,222,765, dated Dec. 14, 1965. Divided and this application Jan. 4, 1965, Ser. No. 435,105
The portion of the term of the patent subsequent to Aug. 4, 1981, has been disclaimed
6 Claims. (Cl. 228—48)

This application is a division of our prior copending application, Serial No. 58,581, filed September 26, 1960, now U.S. Patent No. 3,222,765.

The present invention relates to automatic apparatus for producing welded disk wheels. More particularly, the invention relates to automatic apparatus for welding the rim flange of a bowl shaped wheel disk to a rim fitting over the flange.

For one preferred overall method and assembly-line apparatus environment for utilization of the apparatus according to the present invention, reference may be had to the disclosure of aforesaid U.S. Patent No. 3,222,765.

It is a principal object of the present invention to provide improved welding means to carry out the improved method of producing a welded wheel disk and rim assembly as disclosed in the aforesaid parent or original patent.

It is another object of the invention to furnish an automatic welding machine to continuously weld a rim to a wheel disk.

These and ancillary objects, as well as other objects and advantages, will become apparent to those skilled in the art from the accompanying drawings and the following detailed description of a preferred embodiment of the present invention. However, various modifications and changes in details of construction are comprehended within the scope of the invention defined in the appended claims.

In the drawings:

FIGS. 4 and 5 are fragmentary sectional views showing a burn-through type of weld applied to different types of assemblies.

FIGS. 6 and 7 are similar views showing different types of welds applied to other types of assemblies.

Figure 1:
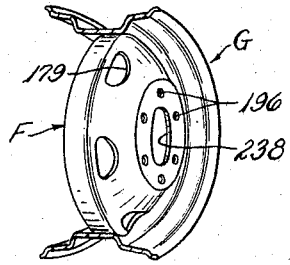
FIG. 1 is a perspective view showing a finished wheel disk bowl pressed into a rim.
Figure 2:
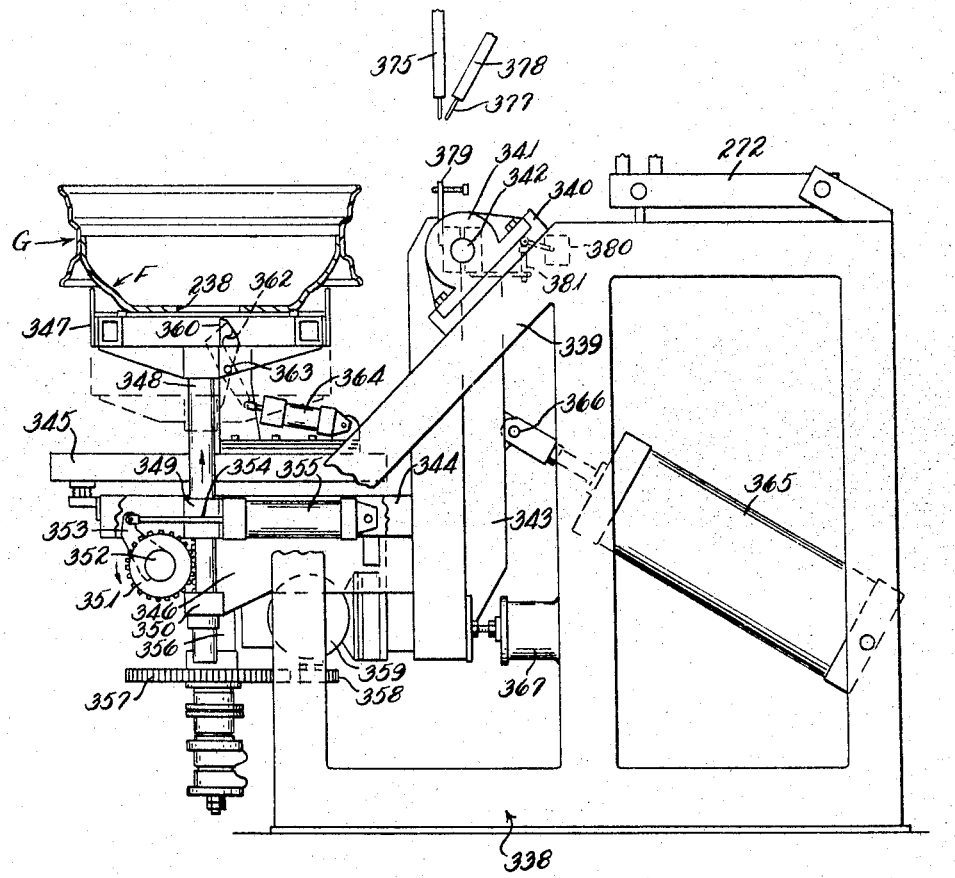
FIG. 2 is an elevational view of the welding apparatus for welding the bowl to the rim, showing the supporting table in position to receive the bowl and rim assembly after the bowl has been press-fit or telescoped into the rim as, for example, by the methods and apparatus disclosed in the aforesaid U.S. Patent No. 3,222,765.
Figure 3:
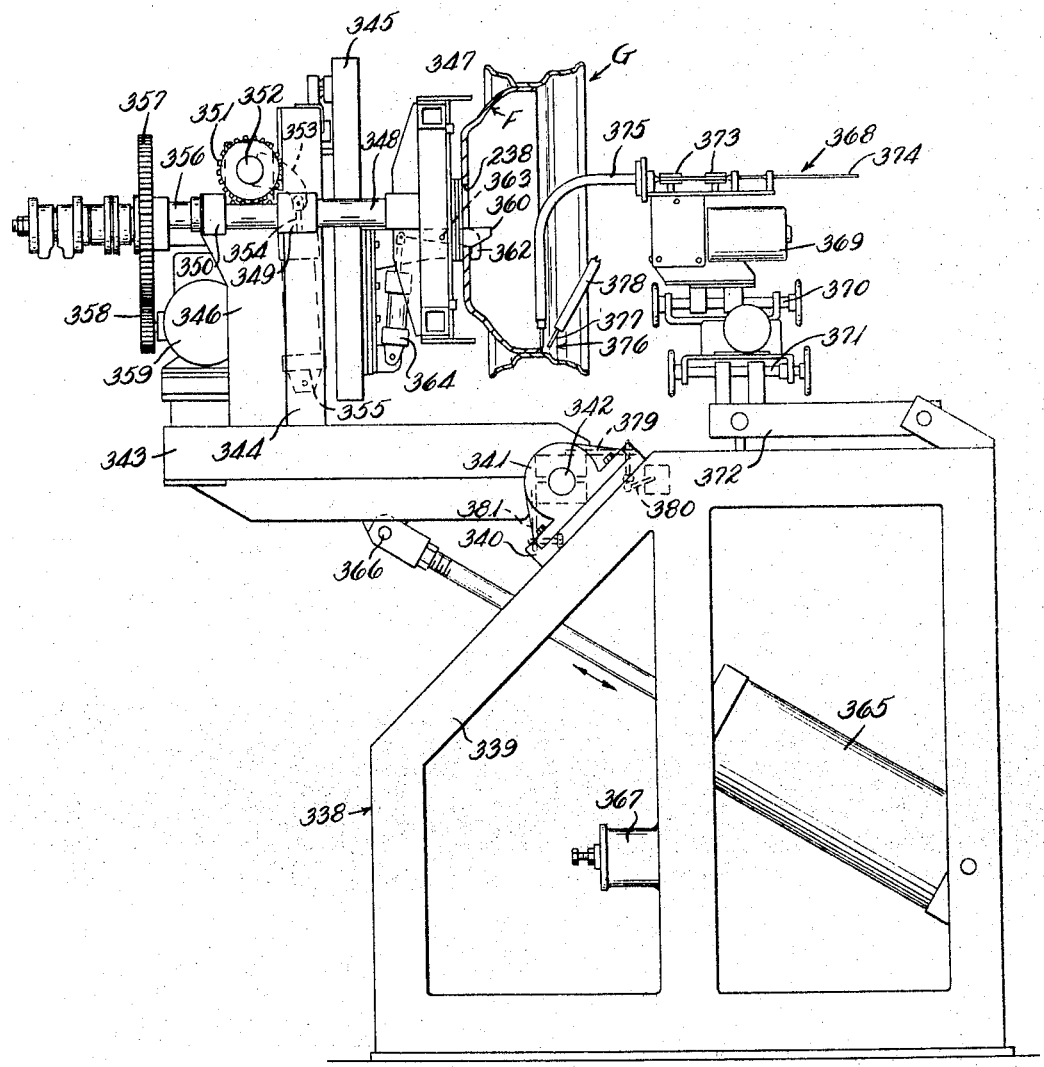
FIG. 3 is a similar view showing the table assembly swung upwardly to bring the assembly into welding position for the welding torch.

The assembly of the wheel and disk from a suitable prior pressing operation as disclosed in the aforesaid parent patent, for example, is indicated as a whole at G in FIGS. 1, 2 and 3. From the pressing operation the assemblies G may be conveyed by suitable means (not shown) to the welding apparatus shown in FIGS. 2 and 3.

The welding apparatus preferably comprises a frame, indicated generally at 338, having an inclined portion 339 on which brackets 340 are secured, and bearings 341 are mounted in the brackets and journal a trunnion shaft 342. A table frame 343 is pivoted on the trunnion shaft 342 and is adapted to lie in a vertical position, as shown in FIG. 2, when the apparatus is in position to receive or unload an assembly G. Frame members 344 extend outwardly at right angles to the frame 343 and support a face plate 345 in parallel relation to the frame members 344. Other frame members 346 extend parallel to the frame members 344 for a purpose to be described.

A table 347 is movably mounted on rack shafts 348 slidable in bearings 349 and 350 on the frame members 344 and 346, respectively, and the shafts 348 have gear rack sections meshing with gear wheels 351 on a rocker shaft 352 journaled at its ends in the outer portions of the frame members 346. The rocker shaft has an arm 353 thereon pivotally connected to the piston rod 354 of a fluid cylinder 355 mounted on one of the frame members 344. Accordingly, actuation of the piston rod 354 will reciprocate the rack shafts 348 and raise and lower the table 347, the lowered position being shown in phantom in FIG. 2 and in full lines in FIG. 3.

Between the rack shafts 348 is a drive shaft 356 journaled in suitable bearings (not shown) on the frame members 344 and 346, and the upper end of the shaft, as viewed in FIG. 2, is slidably keyed in the table 347. A drive gear 357 mounted on the shaft 356 is driven by gearing 358 from a motor 359 supported on the frame 343.

A beveled locator finger 360 (best shown in FIG. 3) is mounted on the table 347 and is adapted to enter the hub hole 238 of the wheel F of the assembly G to center the assembly when the table is lowered. A clamping finger 362 is pivoted on the table at 363, and is adapted to enter and engage the edge of hub hole 238 when the table is lowered to clamp the assembly to the table for rotation therewith. A fluid cylinder 364 is mounted on the face plate 345 and its piston rod is pivotally connected to the opposite end of finger 362 for moving it into and out of clamping position.

A fluid cylinder 365 is mounted on the frame 338, and its piston rod is pivotally connected at 366 to the table frame 343 for swinging the table assembly bodily from the position of FIG. 2 to the position of FIG. 3 about the trunnion shaft 342 as a center. When the table is returned to the position of FIG. 2, it abuts an adjustable table stop 367 on the frame 338. In the raised position of the table shown in FIG. 3, the drive shaft 356 is horizontal and rotates the assembly G on a horizontal axis. In this position, the welding apparatus indicated as a whole at 368 in FIG. 3 is in proper relative position to weld the rim flange of the wheel F to the rim. The welding apparatus preferably comprises a welding head 369 adjustably mounted by adjusting shafts 370 and 371 on a frame member 372 which is vertically adjustably mounted on the frame 338.

The welding head 369 has feed roll means 373 for feeding the weld rod 374 through a curved conduit 375 to the torch zone indicated at 376. A tube 378 is directed into the torch zone which supplies inert gas to shield the welding arc.

In the operation of the welding apparatus, when an assembly G is placed on the table 347, the fluid cylinder 355 is activated to swing the arm 353 clockwise, as viewed in FIG. 2, and cause the rack shafts 348 to lower the table. When the clamping finger 362 enters the hub hole 238, the fluid cylinder 364 may be activated (by a limit switch on the rocker shaft 352, for example) to cause the finger 362 to clamp the hub portion of the wheel F. The lift cylinder 365 is then activated to swing the table assembly to the position of FIG. 3, placing the rim portion of wheel F in welding relation to the torch 376. When the table reaches this position, an arm 379 secured on the trunnion shaft 342 actuates a limit switch 380 on the frame 338, and the limit switch is electrically connected to the drive motor 359 and to the welding circuit, so that the torch is lighted and the wheel assembly starts to rotate simultaneously. When the assembly has rotated through a full revolution, a cyclic timer shuts off the torch and the drive motor 359 and deactivates the lift cylinder 365 to lower the table. When the table assembly reaches bottom against the stop 367, an arm 381 secured on the trunnion shaft 342 reverses the limit switch 380, causing the clamping finger 362 to disengage, and the rack shafts 348 to raise the table to the position of FIG. 2 to unload the welded assembly therefrom.

A preferred type of weld, which may be described as a "burn through weld," is shown in FIG. 4 and may be accomplished by the foregoing operation. In this type of weld the torch is set to burn through the flange R of the bowl F and part way into the drop center portion of the rim 289. The weldment 382 is a continuous circumferential weldment spaced a substantial distance from the edge of the flange, so that it acts as a barrier to prevent elongation of any cracks starting in the edge of bowl flange R. This type of weld affords a maximum strength union of the wheel flange and rim continuously around the entire circumference of the disk and rim, as distinguished from spot welding, and provides a leak-proof union for tubeless tire usage, as an advantage over the use of rivets, bolts and the like.

FIG. 5 shows the same type of weld at 382' in a different rim and bowl assembly.

FIG. 6 shows an assembly of still different of rim and bowl, and also a different type of continuous weld which can be carried out by the aforesaid welding operation by employing a different shape of weld rod conduit. In this case the flange R' of the bowl F' is joined to the rim 383 by a continuous circumferential weldment 384 disposed in the annular groove formed between the flange R' and the rim 383, and penetrating into the walls of both the flange and the rim. The weld rod would be conducted around the outer edge of the rim to bring the torch into the annular groove.

FIG. 7 shows that the continuous weldment may also be applied between the rim 385 and the edge of the bowl flange R" as indicated at 386, penetrating into both the bowl flange and the rim, as an alternative form for any of the above designs of rims or other types of rims to be attached to the bowl flange.

What is claimed is:

1. Apparatus for welding the rim flange of an axially perforate bowl shaped wheel disk to a metal rim fitting over said rim flange in telescoped relation thereto, comprising a base frame, a table frame pivoted on said base frame for swinging through substantially 90°, a drive shaft journaled on said table frame normally in a vertical position, a normally horizontal table splined to said shaft and adapted to support a disk and rim assembly in coaxial relation to said shaft, means to lower said table, means on said table to engage the axial perforation of said disk in the lowered position of said table, means on said base frame for swinging said table frame to place said shaft in a substantially horizontal position, means on the table frame for driving said shaft and rotating said disk and wheel assembly, welding means adjustably mounted on said base frame and having a torch extending within the rim flange when said drive shaft is in substantially horizontal position and adapted to continuously weld said rim flange to said rim as the assembly is rotated.

2. Apparatus for welding the rim flange of an axially perforate bowl shaped wheel disk to a metal rim fitting over said rim flange in telescoped relation thereto, comprising a base frame, a table frame pivoted on said base frame for swinging through substantially 90°, a drive shaft journaled on said table frame normally in a vertical position, a normally horizontal table splined to said shaft and adapted to support a disk and rim assembly in coaxial relation to said shaft, means to lower said table, means to non-rotatively engage said disk and wheel assembly with said table in the lowered position of said table, means on said base frame for swinging said table frame to place said shaft in a substantially horizontal position, means on the table frame for driving said shaft and rotating said disk and wheel assembly, welding means adjustably mounted on said base frame and having a torch extending within the rim flange when said drive shaft is in substantially horizontal position and adapted to continuously weld said rim flange to said rim as the assembly is rotated.

3. Apparatus for welding the rim flange of an axially perforate bowl shaped wheel disk to a metal rim fitting over said rim flange in telescoped relation thereto, comprising a base frame, a table frame pivoted on said base frame for swinging through substantially 90°, a drive shaft journaled on said table frame normally in a vertical position, a normally horizontal table splined to said shaft and adapted to support a disk and rim assembly in coaxial relation to said shaft, rack shafts parallel to said drive shaft and connected to said table, a transverse rocker shaft on said table frame, gears on said rocker shaft meshing with said rack shafts, means to rotate said rocker shaft to lower said table, means to non-rotatively engage said disk and wheel assembly with said table in its lowered position, means on said base frame for swinging said table frame to place said shaft in a substantially horizontal position, means on the table frame for driving said shaft and rotating said disk and wheel assembly, welding means adjustably mounted on said base frame and having a torch extending within the rim flange when said drive shaft is in substantially horizontal position and adapted to continuously weld said rim flange to said rim as the assembly is rotated.

4. Apparatus for welding the rim flange of an axially perforate bowl shaped wheel disk to a metal rim fitting over said rim flange in telescoped relation thereto, comprising a base frame, a table frame pivoted on said base frame for swinging through substantially 90°, a drive shaft journaled on said table frame normally in a vertical position, a normally horizontal table splined to said shaft and adapted to support a disk and rim assembly in coaxial relation to said shaft, means to lower said table, means on said table to engage the axial perforation of said disk in the lowered position of said table, means on said base frame for swinging said table frame to place said shaft in a substantially horizontal position, means on the table frame for driving said shaft and rotating said disk and wheel assembly, welding means adjustably mounted on said base frame and having a torch extending within the rim flange when said drive shaft is in substantially horizontal position and adapted to continuously weld said rim flange to said rim as the assembly is rotated, and means automatically to rotate said drive shaft through a full revolution and simultaneously energize said torch when said table frame has been swung to place said drive shaft in substantially horizontal position.

5. Apparatus for welding the rim flange of an axially perforate bowl shaped wheel disk to a metal rim fitting over said rim flange in telescoped relation thereto, comprising a base frame, a table frame pivoted on said base frame for swinging through substantially 90°, a drive shaft journaled on said table frame normally in a vertical position, a normally horizontal table splined to said shaft and adapted to support a disk and rim assembly in coaxial relation to said shaft, means to lower said table, a clamping arm pivoted on said table to engage in the axial perforation of said disk and clamp the disk to said table, means on said table frame to actuate said arm, means on said base frame for swinging said table frame to place said shaft in a substantially horizontal position, means on the table frame for driving said shaft and rotating said disk and wheel assembly, and welding means adjustably mounted on said base frame and having a torch extending within the rim flange when said drive shaft is in substantially horizontal position and adapted to continuously weld said rim flange to said rim as the assembly is rotated.

6. Apparatus for welding the rim flange of an axially perforate bowl shaped wheel disk to a metal rim fitting over said rim flange in telescoped relation thereto, comprising a base frame, a table frame pivoted on said base frame for swinging through substantially 90°, a drive shaft journaled on said table frame normally in a vertical position, a normally horizontal table splined to said shaft and adapted to support a disk and rim assembly in coaxial relation to said shaft, means to lower said table, a clamping arm pivoted on said table to engage in the axial perforation of said disk and clamp the disk to said table, means on said table frame to actuate said arm, means on said base frame for swinging said table frame to place said shaft in a substantially horizontal position, means on the table frame for driving said shaft and rotating said disk and wheel assembly, welding means adjustably mounted on said base frame and having a torch extending within the rim flange when said drive shaft is in substantially horizontal position and adapted to continuously weld said rim flange to said rim as the assembly is rotated, and means automatically to rotate said drive shaft through a full revolution and simultaneously energize said torch when said table frame has been swung to place said drive shaft in substantially horizontal position.

References Cited by the Examiner
UNITED STATES PATENTS 1,651,399   12/1927   Madden _____ 228—41

JOHN F. CAMPBELL, *Primary Examiner.*

WHITMORE A. WILTZ, *Examiner.*

M. L. FAIGUS, *Assistant Examiner.*